United States Patent Office 3,850,971
Patented Nov. 26, 1974

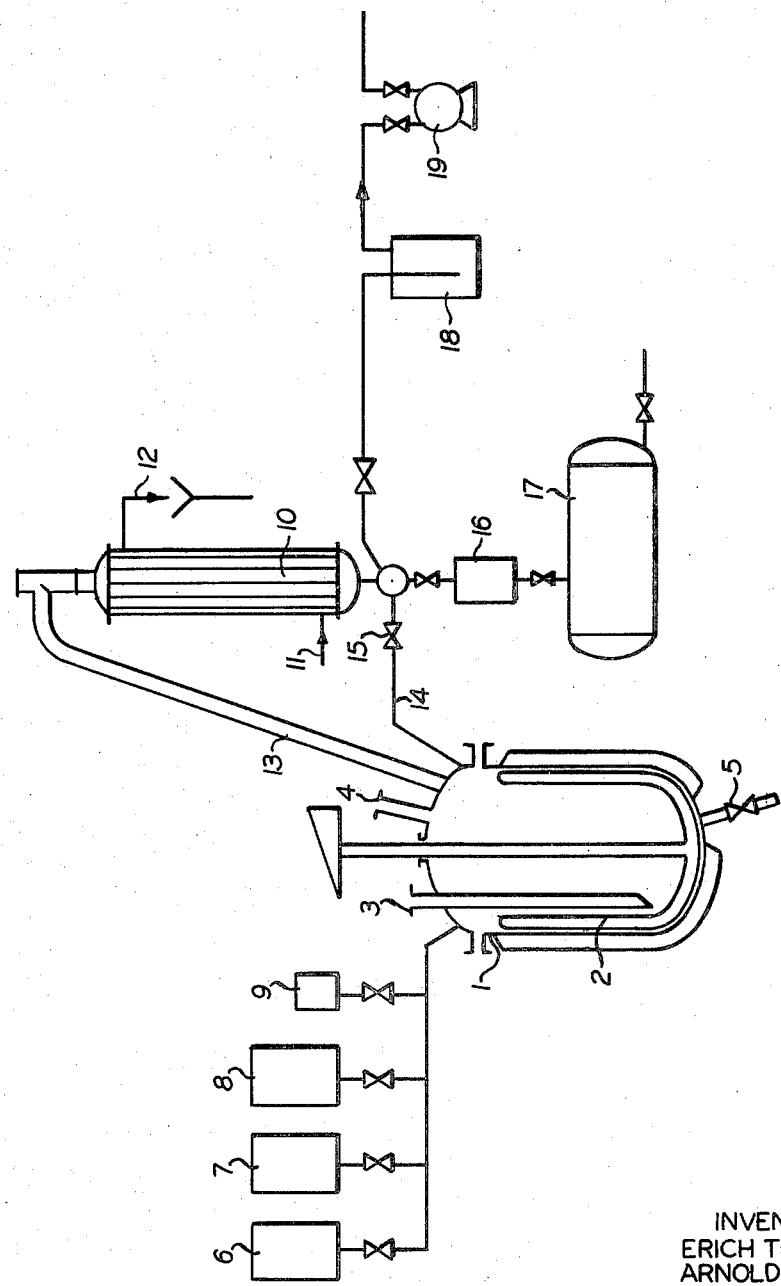

3,850,971
POROUS SILICIC ACID AND ITS PRODUCTION
Erich Termin, Laufenburg, Arnold Lenz, Cologne-Stammheim, and Otto Bleh, Bergheim, Germany, assignors to Dynamit Nobel Aktiengesellschaft, Troisdorf, Germany
Filed Dec. 15, 1970, Ser. No. 98,244
Claims priority, application Germany, Dec. 18, 1969,
P 19 63 439.0
Int. Cl. C07f 7/04
U.S. Cl. 260—448.8 R    7 Claims

ABSTRACT OF THE DISCLOSURE

Porous silicic acid having a specific surface of about 50 to 1000 m.$^2$/g. and having an anion content below the chemically determinable limit of detection is made by hydrolyzing methyl or ethyl silicate or polymethyl or polyethyl silicate with about 70 to 120% of the stoichiometric amount of water with moderate stirring.

Hydrolysis activators such as acids or bases may be present as well as alcoholates of oxides of transition metals which then appear in the end product. Alcohol may also be present to facilitate hydrolysis.

The products are characterized by marked purity and their specific surface can be closely and reproducibly controlled.

---

Porous silicic acid is produced according to known processes by precipitation from alkali silicate solutions. Usually, sodium silicate is used as starting material and acids, preferably sulfuric acid, are employed as precipitants. By this process it is possible to produce silicic acids with large specific surface, particularly when the so-called wet gels are so carefully dried that the primary leaf structure of the silicic acid is carried over to the dry gel, i.e. no condensation of the primary particles takes place. The book "Lehrbuch für Anorganische Chemie" by Hollemann-Wiberg, pp. 338 through 339, 40–46 edition, Walter de Gruyter und Co., Berlin, may be cited as evidencing the state of the art in this respect.

The industrial production of silicic acid by the precipitation method poses many problems. The solution of these problems and the improvement of these manufacturing methods formed the object of a great number of inventions. In Ullmann's "Technische Enzyklopädie," 15, pp. 712–732 (Urban und Schwarzenberg, Munich, 1964) the state of the art in respect of these manufacturing methods and their development is extensively described.

Such silicic acid products usually contain ions which cannot readily be removed although for certain purposes ion-free, i.e. very high purity, silicic acid would be desired.

It is accordingly an object of the invention to provide porous silicic acid and a simple process for its production.

It is another object to provide porous silicic acid of predetermined hydrophilicity.

These and other objects and advantages are realized in accordance with the present invention wherein high specific surface and completely ion-free silica gel are produced by hydrolysis of silicic esters.

It is known from general inorganic chemistry that by hydrolysis of silicic esters according to the following equation $$Si(OR)_4 + 2H_2O \rightarrow SiO_2 + 4ROH,$$

wherein R denotes an alkyl or an aryl radical, silicic acid is formed; however, gels with special properties cannot be produced by this general formula. This is particularly due to the fact that silicic acid esters and water do not mix homogeneously with each other, and many empirical influences act upon the hydrolysis process. Thus, for example, the stirring speed in the hydrolysis vessel has a special effect on the treated silicic ester-water system. With different stirring speeds different gel types are obtained having different pore structures. If a hydrolysis mixture is stirred with a rapidly rotating stirrer, the resulting gel is not homogeneous but rather comprises a thin fluid phase and a resinous thick phase. Furthermore, the structure of the resulting silicic acid is adversely affected if, as is customary, a considerable excess of water is used.

The above difficulties can be overcome in accordance with the invention if the silicic acid ester is hydrolyzed in the presence of about 70 to 120%, preferably 75 to 105% of the stoichiometrically required amount of water with moderate stirring. It is possible, however, in this hydrolysis process to also start from polyalkyl silicates which are formed by a condensation, viz partial hydrolysis, of silicic esters. Preferably, such polyalkyl silicates contain 3 to 5 silicon atoms in the molecule.

In a preferred embodiment porous silicic acid, possibly containing oxides of transition metals, may be made from silicic esters of aliphatic alcohols with 1 or 2 carbon atoms of the corresponding polyalkyl silicates, preferably tetramethyl silicate, optionally containing alcoholates and/or oxides of transition metals, in the presence of about 70 to 120%, preferably 75 to 105% of the stoichiometrically required amount in water, preferably in the presence of about 5 to 100% by volume, relative to the amount of silicic ester or polyalkyl silicate, of an aliphatic alcohol with 1 or 2 carbon atoms, preferably having the same alcohol radical as the silicic ester or polyalkyl silicate, and preferably in the presence of about 0.01 to 2 mole percent, relative to the amount of silicic ester or polyalkyl silicate, of hydrolysis-activating substances, preferably by heating, particularly to temperatures up to the boiling point of the respective alcohol, with stirring, after which the solids are separated by filtration or distilling off the liquid components, and the so isolated silicic acid is dried.

The water required for the hydrolysis can, according to the invention, be added either at once or stepwise in several portions. If one starts from silicic esters the stepwise addition of water initially produces intramolecular polymethyl silicate which is then further hydrolyzed to silica gel.

If, according to the invention, one operates with less than the stoichiometrically required amount of water, e.g. 77%, there are obtained especially desirable end products, viz porous silicic acids with a content in alkoxy groups, preferably methoxy groups, of about 3 to 20, preferably about 12 to 20% by weight, relative to the silicic acid. Such products are very useful for many applications. If, for example, they are used for the production of catalyst carriers, the final catalyst surfaces are positively and specifically influenced by interactions between the actual catalyst and the alkoxy groups contained in the carrier. If they are used as fillers for rubber or plastic mixtures these alkoxy-containing silicic acids show special adhesion and cross-linking properties.

The hydrolysis according to the invention must be carried out under moderate stirring. On the one hand, it is necessary to stir to such an extent that the reaction mixture used as starting material remains as homogeneous as possible; on the other hand, the stirring speed may not be increased to such a degree that the above-mentioned difficulties arise. Thus, no separations into a highly fluid and a resinous phase may occur which would result in unhomogeneous silica gels.

If, for example, hydrolysis reactors of about 0.7 cubic meters and about 0.9 m. diameter are used, the stirring speed of a full-width stirrer during the hydrolysis should be about 40 to 100 revolutions per minute, and during the finishing phase should be about 15 to 30 revolutions per minute. The best speeds with different size vessels and/or stirrers can easily be determined since undesirable speeds will produce the unhomogeneous gel.

Working in the presence of 5 to 100% by volume, relative to the amount of silicic acid or polyalkyl silicate, of aliphatic alcohols with 1 or 2 carbon atoms, particularly having the same alcohol radical as the particular silicic ester or polyalkyl silicate used, permits the homogeneous mixing of the silicic ester or polyalkyl silicate and the water required for the hydrolysis, thereby dispensing with a complicated and expensive removal of water after completion of the hydrolysis. Furthermore, it has surprisingly been found that the size of the specific surface of the porous silicic acid is determined by the amount of alcohol added. If one hydrolyzes in the presence of large amounts of alcohol, the specific surface of the silicic acid will be relatively small. If less alcohol is used, there results a silicic aid of larger specific surface. Without alcohol addition, a silicic acid with the largest surface is obtained.

A further preferred form of execution of the invention involves hydrolysis in the presence of about 0.01 to 2 mole percent, relative to the amount of silicic acid or polyalkyl silicate, of a hydrolysis activator, viz either basic substances or acids.

As suitable basic substances, the following may be cited: ammonia, organic amines, silyl amines, silyl azanes, alkali hydroxides, alkali alcoholates and alkali carbonates. Especially to be emphasized is the favorable effect of ammonia. The basic substances can also be liberated in situ rather than being added as such, i.e. one can also add to the hydrolysis mixture complex compounds which under the reaction conditions of the invention evolve the basic compounds, particularly amines or ammonia. The use of basic-reacting amine compounds of transition metals is also feasible, particularly in the case where silica gels doped with transition metal oxides are to be produced.

As suitable acids, there may be used hydrochloric acid, sulfuric acid, phosphoric acids, acetic acid and formic acid, as well as corresponding silicon or transition metal acylates, as for example silicon tetraformate. Particularly suited are those acids, such as organic acids, whose use does not lead to a contamination of the gels through easily movable ions, such as $Cl^-$ and $SO_4^=$. Best suited is formic acid. The formic esters resulting in the course of the hydrolysis have very low boiling points and are therefore easy to remove by evaporation. Thus, for example, methyl formate boils at 31.8° C. Readily volatile activating substances or activating substance products, like ammonia or formic esters, are also for this reason of great importance in that they do not contaminate the recovery alcohol, and the latter can therefore be re-used. Well suited are also the said silicon or transition metal compounds since they have a triple function:

(1) They act as activators;
(2) They enter in the product and cause no undesirable contaminations; and
(3) They can influence the product relative to wettability with water in whatever direction is desired. For example, alkyl-containing silicon compounds present in the gel make for water repellency. If, for example, trimethoxy-gamma-amino-propyl silane is used as the activating substance, silicon atoms are accordingly built into the silicic acid which are combined with hydrophobic propyl groups. Aluminum oxide portions in the product, on the other hand, are hydrophilic.

The specific surface of the end product is affected by whether one operates without any addition, or whether one adds a hydrolysis-activating substance of acid or basic character. A very large specific surface is obtained if one operates without any addition, viz neutral. There are then obtained values according to the BET method of about 600 to 900 $m.^2/g$. The highest values of the specific surface are obtained when an amount of water is used that lies about 3% below the stoichiometrically required amount.

Greater control with regard to the specific surface of the silicic acid can be obtained if as hydrolysis-activating substance a basic substance is used. If, for example, one starts from a 70% by weight tetramethyl silicate solution in methanol, heats to 50 to 65° C., and then adds ammonia, one obtains after the final processing a silicic acid with a specific surface of about 450 $m.^2/g$. If in a second test the same procedure is followed except that heating is effected for a slightly longer period of time, up to sol formation for example, and the 70% by weight solution is replaced by an 80% by weight solution, there results a surface of about 550 $m.^2/g$. Still higher surfaces are obtained starting from a 90% by weight tetramethyl silicate solution, viz about 620 to 650 $m.^2/g$. Operation entirely without alcohol and boiling 3½ hours under reflux yields a surface of 700 to 1000 $m.^2/g$. This holds true for the entire range of water according to the invention.

A similar control in respect of the development of the surface can be obtained if acids are used as hydrolysis-activating substances although the resulting silicic acids show a comparatively low specific surface. Operating, for example, with formic acid one obtains with the use of 80% by weight of tetramethyl silicate solutions a surface of about 85 $m.^2/g$. If one starts from 90% by weight solutions, one obtains surfaces of about 185° $m.^2/g$. Pure tetramethyl silicate, i.e. without alcohol addition, leads to a specific surface of about 330 $m.^2/g$.

Regarding the surface of silicic acid prepared according to the invention one can summarize that without addition of hydrolysis-activating substances a specific surface of about 600 to 900 $m.^2/g$. is obtained, that the use of basic substances leads to a surface of about 400 to 1000 $m.^2/g$. and that the use of acids leads to values of about 50 to 400 $m.^2/g$. These surface values are readily reproducible.

According to the invention, porous silicic acid containing oxides of transition metals is obtained if one uses silicic esters or corresponding polyalkyl silicates that contain alcoholates and/or oxides of transition metals. The amount of alcoholates and/or oxides of transition metals should be about 0.1 to 30 mole percent, relative to the amount of silicic ester or polyalkyl silicate, and should in the various cases be as much as possible, so chosen that the resulting silicic acid contains about 0.1 to 25% by weight of transition metals and/or oxides of transition metals, relative to the silicic acid. Especially desirable silicic acids are obtained if one starts from silicic esters that contains iron oxides, preferably $Fe_2O_3$, or chromium oxide, preferably $Cr_2O_3$.

Basically, silicic acid which contains oxides of transition metals, preferably $Fe_2O_3$ or $Cr_2O_3$, is particularly well suited as starting material for the production of catalysts or catalyst carriers or as an additive for lowering the specific conductivity of electromagnesia.

Of special interest are also $Al_2O_3$-containing silicic acids which are obtained when aluminum alcoholates or $Al_2O_3$ itself are added to the hydrolysis mixtures. Such silicic acids are distinguished by their hydrophilic behavior.

In the process according to the invention it is possible to operate with regard to the hydrolysis in one step or in two steps. If one operates in one step, all reactants are added together and dissolved or dispersed. Then, for about ½ to 4 hours, preferably under heating, stirring takes place. After completed hydrolysis, the silicic acid is processed according to the invention.

If, on the other hand, the hydrolysis is carried out in two steps then all the substances used in the process are first added together, with the exception of the hydrolysis-activating substance. In the first step, the pre-mixture, preferably under heating to temperatures up to the boiling point of the particular alcohol used, is stirred moderately until sol formation has set in. In the second step the hydrolysis-activating substances are added and stirring is continued, if necessary, about 10 minutes to 4 hours, preferably 30 to 60 minutes, and preferably under further heating. This is then followed again by processing in accordance with the invention.

The hydrolysis according to the invention can basically be effected without any heating. In many cases, however, heating to temperatures of about 30 to about 80° C. is of an advantage. According to a preferred form of execution of the invention, the hydrolysis is carried out under heating to temperatures up to the boiling point of the particular alcohol from which the silicic acid or the polyalkyl silicate derives. If this alcohol is methanol, and additionally ethanol is added as thinner, then heating to higher temperatures, maximally to 78° C., is recommended.

When in the process according to the invention there is added a hydrolysis activator e.g. ammonia, the final wet gel formation sets in within 10 seconds to 15 minutes. Then, usually, heating for another 30 to 60 minutes takes place.

The hydrolysis is then followed by the processing of the precipitated silicic acid. It is best to proceed to distill off all liquid components directly out of the hydrolysis vessel, particularly the resultant alcohols, the added thinning alcohols and any water which may possibly be present. Last traces of adhering alcohols are best removed by heating of the gel to 200 to 270° C. At the end of this heating period the pressure in the vessel is lowered to about 1 to 40 mm. Hg. The resulting silicic acids have alcohol contents of less than 1% by weight. Sometimes, also, a subsequent drying of the resultant silicic acid, e.g. in a fluidized bed or in a tunnnel drier, is required.

It is also possible to separate all liquid components from the silicic acid by filtration. Suitable filtering devices are for example, revolving funnels or filter presses. A separation by filtration must in each case be followed by drying.

The invention will be further described with reference to the accompanying drawing which is a schematic flow sheet showing the equipment and steps for carrying out the process.

Referring now more particularly to the drawing, the reaction mixture is placed in the hydrolysis reactor 1 which is equipped with a full-width stirrer 2, a temperature measuring device 3, a filler cap 4 and a discharge pipe 5. To the side and above the hydrolysis vessel there are mounted a container for the silicic ester or polyalkyl-silicate 6, a container for the thinning alcohol 7, a container for distilled water 8 and a container for concentrated ammonia solution 9. All containers are connected by feed lines and valves to the reactor 1. To the right, above the reactor, a condenser 10 with cooling water inlet 11 and cooling water outlet 12 is located. Condenser 10 and reactor 1 are connected with each other by steam pipe 13. Pipe line 14 and valve 15 constitute a further connection between these two elements, useful for a possible reflux distillation. A receiver 16 for the distillate and a container 17 serve for taking up the alcohol resulting from the processing of the silicic acid. A freezing vessel (cooling trap) 18 for the distillate is located in front of a vacuum pump 19. A special effect is achieved by the use of a reactor with a full-width stirrer. One obtains excellent, lump-free fine gels and during the processing phase has a good heat transfer from the reactor wall to the product.

The apparatus illustrated in the drawing constitutes only one illustrative example for installations that are suited for use in the process according to the invention and variations lying within the competence of one skilled in the art can be made.

Because the novel process involves a practically "non aqueous" operation, an extraordinary saving in time at the processing stage is realized. There is not required a filtration of the silicic acid suspension. In most cases, a simple distillation of methanol or ethanol is effected which leads directly to the desired degree of dryness of the end product. Should in certain cases an additional drying appear to be necessary, it can be carried out without any difficulty and expenditure of time by reason of the easy evaporability of the alcohol traces. As is known, water traces can be removed from porous solid substances only with the greatest of difficulty and only at great expenditure of time and effort so that in this regard the process according to the invention is far superior to the alkali silicate precipitation process.

Further advantages of the method according to the invention over the known silicate precipitation process are that higher final degrees of dryness are obtained, and that silicic acid can be produced that is especially pure and free from foreign ions. On the other hand, the possibility is afforded of producing special silicic acids characterized by predetermined contents of alkyl, aryl or alkoxy groups or of metal oxides.

As noted, an especial advantage of the new process is the fact that the specific surface of the silicic acid can be precisely controlled by proper choice of the particular reaction conditions. This may be of special significance, for example, in the use of the silicic acid in the catalyst sector or as a filler for rubber and plastic materials.

Particularly surprising in the development of the new process was the possibility of obtaining such fine-pored and pure silicic acid with such a high specific surface, which is extremely well and accurately reproducible. Particularly surprising was the fact that the use of ammonia for the hydrolysis of silicic esters of polyalkyl silicates resulted in large specific surfaces for the resulting gel, especially in view of Ullmann's "Technische Enzyklopädie," *15* which on p. 719 states that the presence of ammonia in the hydrolysis mixture leads to wide-pored gels with low specific surface.

As noted, the invention provides a novel porous silicic acid, optionally containing methoxy groups, having a specific surface of about 400 to about 900 m.$^2$/g. according to the BET method, with a content in metals or metal oxides of less than 10 p.p.m. and a content in anions, especially Cl$^-$ and SO$_4^=$, below the chemically determinable limit of detection (precipitation, AgCl and BaSO$_4$, visually or nephelometrically).

By the use of a basic hydrolysis-activating substance such as ammonia, and by addition to the hydrolysis mixture of appropriate amounts of alcoholates and/or oxides of transition metals prior to the hydrolysis, it is possible to obtain such porous, silicic acids with a total content in transition metals and oxides of transition metals, especially in one or several of the metals titanium, iron, aluminum or chromium and/or one or several of the oxides of titanium, iron, nickel, cobalt, tungsten, molybdenum, manganese, niobium, tantalum or chromium of 0.2 to 25.0, preferably 1.0 to 10% by weight, relative to the silicic acid (that is the total product).

As noted, the invention also provides porous, optionally methoxy-containing, silicic acid with a specific surface of about 50 to 400 m.$^2$/g. according to the BET method, with a content in metals or metal oxides of less than 10 p.p.m., produced by using acids as hydrolysis-activating substances. If to the hydrolysis mixture, prior to hydrolysis, alcoholates and/or oxides of transition metals are added, a silicic acid is obtained with a total content in transition metals and/or oxides of transition metals, especially one or several of the metals titanium, iron, nickel, cobalt, tungsten, molybdenum, manganese, niobium, tantalum, or chromium and/or one or several of the oxides of titanium, iron or chromium, or 0.2 to 25, preferably 1 to 10% by weight, relative to the silicic acid. The methoxy content may range from about 3 to 20, preferably 12 to 20% by weight, relative to the silicic acid (i.e. the total product).

The gels according to the invention can find use in the most diversified fields of application, e.g. as fillers for paper, rubber, plastics, as adsorbents and carrier substances for catalysts and other additives, such as pesticides, as thickeners and insulating material, as delusterants for lacquers and varnishes, other films etc., for the clarification of liquids, e.g. beer and wine, and as aids in filtering, grinding and sieving operations, in chromatography, as a free-flow aid, as means against blocking and counterpressure manifestations, as raw material for the preparation of extremely pure silicates, as a carrier substance, thickening and thixotroping agent as well as emulsion stabilizer for vibration mixtures, aids for powder and suppositories in the cosmetic, pharmaceutical and detergent industries, and the like.

Because of its absolute freedom from ions, the gel prepared according to the invention can be used for special purposes for which gels prepared by the silicate precipitation process can be used only after having been subjected to additional purification procedures such as ion exchange, or the like.

The invention will be further described in the following illustrative examples wherein all parts are by weight unless otherwise specified.

EXAMPLE 1

Using an installation as shown in the drawing, into the tank 1 equipped with a full-width stirrer there were introduced from the supply bin 6 2210 kg. of tetramethyl silicate. 90 kg. of methanol from container 7 and 48.3 kg. distilled water from container 8 were added. The homogeneous mixture obtained was heated during 45 minutes to boiling, and at the boiling temperature of the mixture (at 69° C.) 150 ml. of concentrated ammonia solution from container 9 were added. The mixture immediately began to gel with frothing. The mixture was refluxed at the boil for another ½ hour. After that, the temperature dropped by 5–80° C. to a constant value, the boiling temperature of the alcohol, viz 64° C., and the system was changed over to distillation. The distillate, methyl alcohol, passed from the condenser 10 through receiver 16 into the supply tank 17. After about 3 hours, the distillation was completed. The temperature in the tank was brought to about 200° C. and the finished gel kept one hour at this temperature. Evacuation was thereafter effected by means of a liquid seal pump 19 driven by way of alcohol circulation over a cooling trap 18 and kept about 30 minutes at about 200° C. and about 30 mm. Hg vacuum. Next, the vessel was cooled and the final product removed through the bottom valve 5.

The drying and cooling procedure took about 3½ hours so that the entire process lasted about 8 hours.

82 kg. of a gel were obtained with pores of medium to fine size. The specific surface was 457 m.$^2$/g., as determined by the method of S. Brunauer, P. H. Emmet and E. Teller (BET method), published in J. Am. Chem. Soc. *60* (1938), 309.

EXAMPLE 2

The procedure as in Example 1 was followed, except that the ammonia was added at the temperature of the reaction mixture at 50° C. The gel did not form immediately, but only after 8 minutes. There were obtained 82 kg. of a gel which was practically the same as that of Example 1; the specific surface was 473 m.$^2$/g.

EXAMPLE 3

The procedure of Example 1 was followed except that there was used as thinning alcohol an ammonia-contaminated return alcohol according to Example 2. Gelation started after 15 minutes during the heating up period. After that, there were further added during the gelation period at about 50° C. 50 ml. of concentrated ammonia. 83 kg. of a very fine gel with a specific surface of 510 m.$^2$/g. were obtained.

EXAMPLE 4

The same installation as described in Example 1 was used and the procedure corresponded roughly to that of Example 1, except that no thinning was added. 304 kg. of tetramethyl silicate and 72 kg. of water were used and the mixture was heated to boiling for 3½ hours under reflux. Only then were 150 ml. of concentrated ammonia added. The further manner of procedure corresponded to that of Example 1. As final product there were obtained 114 kg. of a loose fine gel with a specific surface of 723 m.$^2$/g.

EXAMPLE 5

The procedure of Example 4 was employed, except that a stoichiometric water deficiency of 5%, i.e. 68.4 kg. water, was used. There were obtained 116 kg. of a very fine gel which differed from that of Example 4 in that it contained methoxyl groups and also had a higher specific surface. The specific surface was 780 m.$^2$/g., the methoxyl group content about 15% by weight, relative to the total weight of the silicic acid.

EXAMPLE 6

In a laboratory scale vessel with stirrer, the same procedure as in Example 4 was followed using 608 g. of tetramethyl silicate
137 g. of water (5% below stoichiometry)
5 drops of concentrated ammonia.

There were obtained 273 g. of a very fine-pored, very fine-grained gel. The specific surface came to 946 m.$^2$/g. The methoxy group content was 18% by weight, relative to the total weight of the silicic acid.

EXAMPLES 7 THROUGH 12

In a laboratory-sized vessel with stirrer, separate batches of 304.0 g. of tetramethyl silicate were diluted with 34.0 g. of methanol and hydrolyzed with various amounts of water. In the 6 tests, the following amounts of water were added: 70 g., 72 g., 74 g., 75.6 g., 77 g. and 79.2 g., corresponding respectively to 97%, 100%, 103%, 105%, 107% and 110% of the stoichiometrically required amount of water. The reaction mixtures were in each case heated to boiling for 2 to 4 hours, under reflux distillation, and after that, mostly with the occurrence of a viscosity change of the mixture, mixed with 5 drops of concentrated ammonia. Fine-pored fine gels with almost homogeneous specific surfaces were obtained after processing as in Example 1. These surfaces were, respectively, 645.0, 618.0, 651.5, 632.5, 640.0 and 640.0 m.$^2$/g. The yields in SiO$_2$ were within the theoretical range.

EXAMPLES 13 THROUGH 15

In accordance with Examples 7 through 12, the following tetramethyl silicate compositions were hydrolyzed:

Example 13

304.0 g. of tetramethyl silicate
74.0 g. of methanol
70.0 g. of water
5 drops of concentrated ammonia.

A gel with a specific surface of 552 m.$^2$/g. was obtained.

Example 14

304.0 g. of tetramethyl silicate
74.0 g. of methanol
70.0 g. of water
5 drops of hexamethoxydisilyl azane.

The specific surface of the resulting gel was 530 m.$^2$/g.

Example 15

304.0 g. of tetramethyl silicate
74.0 g. of methanol
70.0 g. of water
5 drops of trimethoxy-gamma-aminopropyl silane.

The specific surface of the resultant gel came to 536 m.$^2$/g. The product was pronouncedly hydrophobic.

EXAMPLE 16

In a laboratory scale vessel with stirrer 608 g. of tetramethyl silicate were mixed with 70 g. of water and for 4 hours heated to boiling with reflux. There first set in polymethyl silicate formation, as could be seen from the rise of the boiling temperature. After the boiling temperature remained constant, a further 70 g. of water and a few drops of concentrated ammonia solution were added. Gel formation set in spontaneously. After that, the procedure as in Example 1 was followed. The gel so obtained was very fine and had a specific surface of 521 m.$^2$/g.

EXAMPLE 17

(a) To prepare a hydrophilic silica gel, a laboratory size vessel with stirrer was used, which in makeup and effect corresponded to the reactor used in Example 1. Here, however, there was additionally used aluminum trimethylate, the mixture having the following composition:

304.0 g. of tetramethyl silicate
10.5 g. of aluminum trimethylate
138.0 g. of methanol
76.0 g. of water
5 drops of concentrated ammonia.

123.5 g. of a fine silica gel with 3.5% by weight of aluminum oxide, relative to the total gel, were obtained. The specific surface was 401 m.$^2$/g. The resultant gel mixes particularly well with water.

(b) 10 g. of an ordinary, aluminum oxide-free gel with the same specific surface as the gel of (a) were stirred into 200 ml. of water. The dispersal time of the aluminum oxide-free gel was 25% greater than that of the gel of (a).

EXAMPLE 18

To prepare a titanium-oxide containing gel, in a laboratory size stirrer the procedure of Example 1 was followed using:

304.0 g. of tetramethyl silicate
130.0 g. of methanol
5.5 g. of tetramethyl titanate
73.5 g. of water
5 drops of concentrated ammonia.

There were obtained 119.5 g. of a gel with a 2% by weight titanium oxide content, relative to the total gel. The specific surface came to 462 m.$^2$/g.

EXAMPLE 19

To prepare an iron-containing gel, the gel was prepared in a laboratory-sized stirrer. The procedure of Example 1 was followed, using:

304.0 g. of tetramethyl silicate
80.0 g. of methanol
12.0 g. of Fe$_2$O$_3$ (size of grain 5 to 10 microns)
75.6 g. of water
5.0 ml. of concentrated ammonia.

There were obtained 130.0 g. of a very fine gel, which contained about 10% by weight of Fe$_2$O$_3$. The specific surface was 536 m.$^2$/g. The distribution of the Fe$_2$O$_3$ was extremely homogeneous.

EXAMPLES 20 THROUGH 21

The procedures were analogous to those of Examples 1 and 4, except that in place of tetramethyl silicate, tetraethyl silicate in the same stoichiometric ratios was employed.

Fine gels with the following specific surfaces were obtained:

Example 20 (corresponding to Example 1), 380 m.$^2$/g.
Example 21 (corresponding to Example 4), 680 m.$^2$/g.

EXAMPLE 22

The procedure of Example 1 was followed, except that in place of ammonia, 150 ml. of 20% by weight NaOH solution were added as catalyst. The reaction set in spontaneously. There was obtained a fine gel with a specific surface of 412 m.$^2$/g.

EXAMPLE 23

The procedure as in Example 6 was followed, except that in place of ammonia 5 drops of a 15% by weight sodium methylate solution were added as catalyst.

A gel with a specific surface of 998 m.$^2$/g. was obtained.

EXAMPLE 24

608.0 g. of tetramethyl silicate were mixed with 140.0 g. of water (3% below stoichiometry) in a vessel provided with a full-width stirrer operating at about 60 revolutions per minute. The vessel contents were heated to the boil and reflux condensed. After about 150 minutes sol formation started. At this point 0.2 ml. of concentrated formic acid was added to the reaction mixture. After a further 30 to 60 minutes of heating the hydrolysis was completed. The resultant alcohol was distilled off and contained less than 1% water. The temperature in the reaction vessel was then increased to 250° C. and the product dried first at normal pressure, then at about 30 mm. Hg vacuum during 3 hours. There were obtained 229.0 g. of gel which approximately corresponded to the theoretical yield. The gel was uncontaminated by alkali or acid ions. It had a specific surface of 324 m.$^2$/g.

EXAMPLES 25 AND 26

The method of Example 24 was employed, except that the particular silicic ester used was so diluted with methanol that 90 and 80%-ester solutions were obtained. These ester solutions were mixed with 97% of the stoichiometric amounts of water and brought to boiling. During the sol forming phase after 2 to 3.5 hours of reaction time the solution was, as in Example 1, mixed with 0.4 ml. of concentrated formic acid per kg. of ester used. After further processing as in Example 1, a gel with the following specific surfaces was obtained:

90%-ester—185 m.$^2$/g. (Example 25)
80%-ester—85 m.$^2$/g. (Example 26).

EXAMPLE 27

A procedure analogous to that of Example 17 was used, except only that in place of 10.5 g. of aluminum trimethylate 10 g. of magnesium stearate were used. A hydrophobic gel was obtained. If put into water, it did not sink notwithstanding what was to be expected by reason of its specific gravity. For a period of 2 hours no wetting took place, the gel continuing to float on the surface of the water.

It will be appreciated that the instant specification and examples are set forth by way of illustration and not limitation and that various modifications and changes may be made without departing from the spirit and scope of the present invention.

What is claimed is:

1. Process for making porous silicic acid gel which comprises contacting methyl or ethyl silicate, or polymethyl or polyethyl silicate in the presence of a hydrolysis activating substance, with about 70 to 120% of the stoichiometric amount of water with stirring under conditions to achieve homogeneity to effect hydrolysis and produce solid silicic acid having a specific surface of about 50 to 1000 m.$^2$/g., separating the solid silicic acid from the liquid and drying the resulting porous silicic acid.

2. Process according to claim 1, wherein methyl or ethyl silicate or polymethyl or polyethyl silicate are contacted with about 75 to 105% of the stoichiometric amount of water.

3. Process according to claim 1, wherein during hydrolysis there is present methanol or ethanol in about 5 to 100% by volume of the silicate.

4. Process according to claim 1, wherein the water is added stepwise during hydrolysis.

5. Process according to claim 1, in which the water is supplied in at least about 75% of, but less than 100% of, the stoichiometric amount.

6. Process according to claim 1, wherein during hydrolysis there is present about 0.1 to 2 mole percent based on the silicate of a basic substance.

7. Porous silicic acid gel having a specific surface of about 50 to 1000 m.$^2$/g. and having an anion content below the chemically determinable limit of detection, said gel containing about 3 to 20% by weight of methoxy or ethoxy radicals bonded to silicon.

References Cited
UNITED STATES PATENTS

| | | | |
|---|---|---|---|
| 1,450,467 | 4/1923 | Weyland | 23—182 R X |
| 1,809,755 | 6/1931 | King et al. | 23—182 R X |
| 1,909,008 | 5/1933 | Prange | 23—182 R X |
| 1,935,178 | 11/1933 | Connolly | 23—182 R X |
| 2,027,931 | 1/1936 | Ray | 23—182 R X |
| 2,757,073 | 7/1956 | Drexel | 23—182 R |
| 2,794,002 | 5/1957 | Haensel | 23—182 R X |
| 2,834,739 | 5/1958 | Becker et al. | 23—182 R X |
| 3,146,252 | 8/1964 | Emblem et al. | 23—182 R X |
| 3,245,918 | 4/1966 | Burzynski | 23—182 R X |
| 3,494,875 | 2/1970 | Le Page et al. | 23—182 R X |
| 3,554,698 | 1/1971 | Burzynski et al. | 23—182 R |

DANIEL E. WYMAN, Primary Examiner

P. F. SHAVER, Assistant Examiner

U.S. Cl. X.R.

252—451, 316, 317; 260—46.5 R; 423—326, 338, 339